United States Patent
Bontu et al.

(10) Patent No.: US 8,416,731 B2
(45) Date of Patent: Apr. 9, 2013

(54) TRANSMISSION IN A RELAY NODE-BASED WIRELESS COMMUNICATION SYSTEM

(75) Inventors: Chandra S. Bontu, Nepean (CA); Amin Mobasher, Waterloo (CA)

(73) Assignee: Research In Motion Limited, Waterloo, Ontario Limited ( * ) Notice: Subject to any disclaimer, the term of this patent is extended or adjusted under 35 U.S.C. 154(b) by 231 days.

(21) Appl. No.: 12/768,016

(22) Filed: Apr. 27, 2010

(65) Prior Publication Data

US 2011/0261745 A1    Oct. 27, 2011

(51) Int. Cl.
  H04B 7/14    (2006.01)
  H04J 1/10    (2006.01)
  H04J 3/08    (2006.01)

(52) U.S. Cl.
  USPC ......................................................... 370/315

(58) Field of Classification Search .................. None
  See application file for complete search history.

(56) References Cited

U.S. PATENT DOCUMENTS

| | | | |
|---|---|---|---|
| 7,643,793 B2 * | 1/2010 | Park et al. .................... | 455/16 |
| 7,720,020 B2 | 5/2010 | Larsson | |
| 2007/0086512 A1 | 4/2007 | Can et al. | |
| 2007/0217432 A1 | 9/2007 | Molisch et al. | |
| 2008/0165721 A1 | 7/2008 | Fujii et al. | |
| 2008/0282133 A1 | 11/2008 | Lo et al. | |
| 2009/0175214 A1 * | 7/2009 | Sfar et al. .................... | 370/315 |
| 2009/0227201 A1 * | 9/2009 | Imai et al. .................... | 455/7 |
| 2010/0008284 A1 * | 1/2010 | Chae et al. .................. | 370/315 |
| 2010/0232345 A1 * | 9/2010 | Tsai et al. .................... | 370/315 |
| 2010/0330902 A1 * | 12/2010 | Fujita ............................ | 455/7 |

FOREIGN PATENT DOCUMENTS

| | | |
|---|---|---|
| EP | 1843488 A1 | 10/2007 |
| WO | 2006118125 A1 | 11/2006 |
| WO | WO 2009118780 A1 * | 10/2009 |
| WO | 2010034339 A1 | 4/2010 |
| WO | 2010041295 A1 | 4/2010 |

OTHER PUBLICATIONS

B. Can, H. Yomo, E. De Carvalho, Hybrid Forwarding Scheme for Cooperative Relaying in OFDM Networks, Proceedings of the 2006 IEEE International Conference on Communications, Jun. 2006, pp. 4520-4525.*

B. Can, M. Portalski, Y. Le Moullec, Hardware Aspects of Fixed Relay Station Design for OFDM(A) based Wireless Relay Networks, Proceedings of The Canadian Conference on Electrical and Computer Engineering, May 7, 208, pp. 355-360.*

W. Ni, G. Shen, S. Jin, F. Liu, L. Chen, X. She, D. Gu, and F. Watanabe, HARQ Mechanisms in Multi-hop relay, Jan. 15, 2007, pp. 1-8.*

(Continued)

*Primary Examiner* — Faruk Hamza
*Assistant Examiner* — Christopher Crutchfield
(74) *Attorney, Agent, or Firm* — Conley Rose P.C.; J. Robert Brown, Jr.

(57) ABSTRACT

Methods, devices and systems for improved transmission in a remote node-based wireless communication system is provided. In one embodiment, a method of wireless communication comprises receiving a downlink signal from a first node, demodulating said received downlink signal, generating a channel quality measurement ("CQM") value of said demodulated downlink signal, determining said CQM value exceeds a first threshold, modulating said demodulated downlink signal to form a processed downlink signal, and cooperatively transmitting said processed downlink signal with said first node to a wireless device.

19 Claims, 15 Drawing Sheets

OTHER PUBLICATIONS

B. Can, H. Yomo, E. De Carvalho, Link Adaptation and Selection Method for OFDM Based Wireless Relay Networks, Journal of Communications and Netowrks, vol. 9, No. 2, Jun. 2007, pp. 118-127.*
E. Beres, Node Selection in Cooperative Wireless Networks, Sep. 23, 2009, pp. 1-169.*
3GPP TR 36.814 V9.0.0; 3rd Generation Partnership Project; Techincal Specification Group Radio Access Network; Evolved Universal Terrestrial Radio Access (E-UTRA); Further Advancements for E-UTRA Physical Layer Aspects; Release 9; Mar. 2010; 104 pages.
3GPP TS 36.213 V9.3.0; 3rd Generation Partnership Project; Techincal Specification Group Radio Access Network; Evolved Universal Terrestrial Radio Access (E-UTRA); Physical Layer Procedures; Release 9; Sep. 2010; 80 pages.
3GPP TS 36.211 V9.1.0; 3rd Generation Partnership Project; Techincal Specification Group Radio Access Network; Evolved Universal Terrestrial Radio Access (E-UTRA); Physical Channels and Modulation; Release 9; Mar. 2010; 85 pages.
Hoshyar, Reza, et al.; "Performance Evaluation of HARQ Schemes for Cooperative Regenerative Relaying;" IEEE; 2009; 6 pages.
European Extended Search Report; Application No. 11157962.9; Sep. 15, 2011; 6 pages.
Japanese Office Action; Application No. 2011-099460; Sep. 4, 2012; 7 pages.
Korean Office Action; Application No. 10-2011-0039604; Aug. 20, 2012; 8 pages.

* cited by examiner

TRANSMISSION IN A RELAY NODE-BASED WIRELESS COMMUNICATION SYSTEM

CROSS-REFERENCE TO RELATED APPLICATIONS

There are no related applications.

FIELD

The invention generally relates to wireless communication and in particular to improved transmission in a wireless communication system using relay nodes.

BACKGROUND

Wireless communication systems are widely deployed to provide, for example, a broad range of voice and data-related services. Typical wireless communication systems consist of multiple-access communication networks that allow users to share common network resources. Examples of these networks are time division multiple access ("TDMA") systems, code division multiple access ("CDMA") systems, single-carrier frequency division multiple access ("SC-FDMA") systems, orthogonal frequency division multiple access ("OFDMA") systems, or other like systems. An OFDMA system is adopted by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency and a better user experience especially in high-demand urban areas. LTE accomplishes this higher performance with the use of broader spectrum bandwidth, OFDMA and SC-FDMA air interfaces, and advanced antenna methods. Uplink ("UL") refers to communication from a wireless device to a node. Downlink ("DL") refers to communication from a node to a wireless device.

A relay node ("RN") can be used in a wireless communication system to, for instance, extend signal coverage. Further, an RN can improve overall system capacity by cooperatively transmitting, receiving or both a signal for a wireless device. For example, an RN can improve the DL system capacity by cooperatively transmitting a DL signal concurrently with a base station such that signal reception at the wireless device is improved. Similarly, an RN can also improve the UL system capacity by cooperatively transmitting an UL signal concurrently with a wireless device such that signal reception at the base station is improved.

In a typical RN deployment, a DL signal transmitted from a base station may be re-transmitted by one or more RNs before reaching a wireless device. Because of the one or more re-transmissions involved in getting the DL signal to the wireless device, latency such as packet delay may increase. Increased packet delay is important in, for instance, hybrid automatic repeat request ("HARQ")-enabled real time applications, such as voice over internet protocol ("VoIP"), video streaming and video conferencing. For such time-sensitive applications, increased latency may result in decreased quality of service ("QoS"), loss in frame synchronization or other impairments. Therefore, a relay node-based wireless communication system may improve system coverage, system capacity or both but may adversely affect system latency. This disclosure provides methods, devices and systems for reducing such latency associated with DL transmission in a wireless communication system using RNs.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Figure 1:
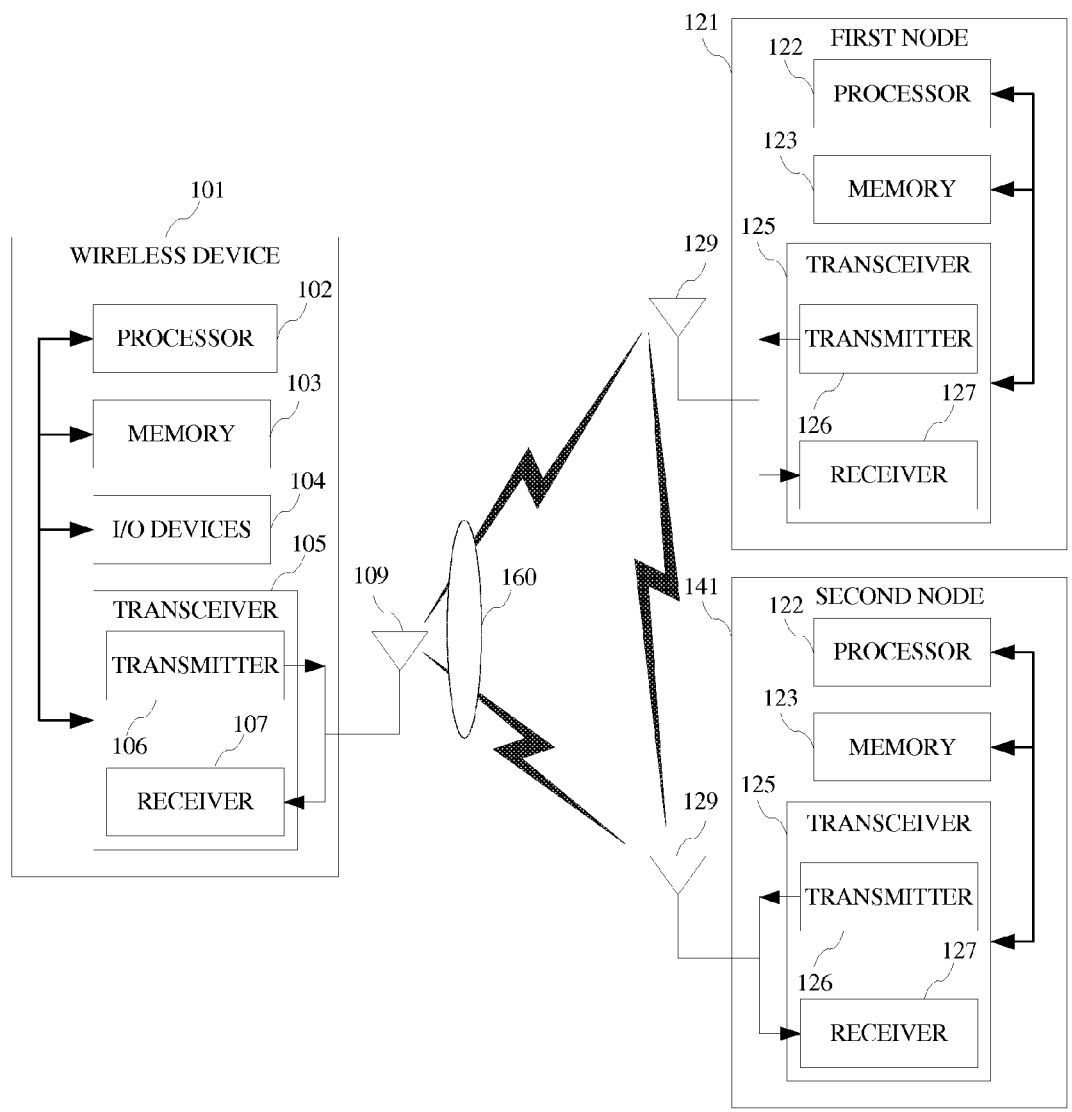
FIG. 1 is a block diagram of one embodiment of improved transmission in a relay node-based wireless communication system in accordance with various aspects set forth herein.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in wireless communication systems, it may be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed examplaries are not the only way to implement such methods, devices and systems, and the drawings and descriptions should be regarded as illustrative in nature and not restrictive.

Various techniques described herein can be used for various wireless communication systems. The various aspects described herein are presented as methods, devices and systems that can include a number of components, elements, members, modules, nodes, peripherals, or the like. Further, these methods, devices and systems can include or not include additional components, elements, members, modules, nodes, peripherals, or the like. In addition, various aspects described herein can be implemented in hardware, firmware, software or any combination thereof. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form. It is important to note that the terms "network" and "system" can be used interchangeably.

A wireless communication system can typically consist of a plurality of wireless devices and a plurality of nodes. A node may also be called a base station, node-B ("NodeB"), base transceiver station ("BTS"), access point ("AP"), cell, remote node ("RN"), serving node, satellite or some other equivalent terminology. Further, the term "cell" can include a specific base station, a specific sector of a base station, and a specific antenna of a sector of a base station. A node can contain one or more radio frequency ("RF") transmitters, receivers or both to communicate with one or more wireless devices. Further, a node can be fixed, stationary or both. For LTE and LTE-A equipment, a base station is referred to as an E-UTRAN NodeB ("eNB").

A wireless device used in a wireless communication system may also be referred to as a mobile station ("MS"), a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a node. Further, a wireless device may be fixed or mobile and may have the ability to move through a wireless communication network. For LTE and LTE-A equipment and for various industry standards, the wireless device is also referred to as user equipment ("UE").

FIG. 1 is a block diagram of one embodiment of improved transmission in a relay node-based wireless communication system 100 in accordance with various aspects set forth herein. In FIG. 1, system 100 can include a wireless device 101, a first node 121 and a second node 141. Wireless device 101 can include a processor 102 coupled to a memory 103, an input/output devices 104, a transceiver 105 or any combination thereof, which can be utilized by wireless device 101 to implement various aspects described herein. Transceiver 105 of wireless device 101 can include one or more transmitters 106 and one or more receivers 107. Further, associated with wireless device 101, one or more transmitters 106 and one or more receivers 107 can be connected to one or more antennas 109.

In FIG. 1, first node 121 can include a processor 122 coupled to a memory 123 and a transceiver 125. Transceiver 125 of first node 121 can include one or more transmitters 126 and one or more receivers 127. Further, associated with first node 121, one or more transmitters 126 and one or more receivers 127 can be connected to one or more antennas 129. Similarly, second node 141 can include a processor 122 coupled to a memory 123 and a transceiver 125. Transceiver 125 of second node 141 includes one or more transmitters 126 and one or more receivers 127. Further, associated with second node 141, one or more transmitters 126 and one or more receivers 127 are connected to one or more antennas 129.

In this embodiment, first node 121, second node 141, another node or any combination thereof can cooperatively transmit a DL signal to wireless device 101, as represented by 160. Cooperative transmission of a DL signal by first node 121, second node 141, other node or any combination thereof, as represented by 160, can provide improved receiver performance for wireless device 101 by performing, for instance, concurrent transmission of the DL signal; coordinated transmission of the DL signal to provide an antenna array-like function; coordinated transmission of a DL signal to provide an antenna beam forming-like function; other transmission function; or any combination thereof. Concurrent transmission of the DL signal by first node 121, second node 141, other node or any combination thereof may be at or near the same time sufficient to provide improved receiver performance for wireless device 101. Further, each concurrent transmission may occur at a different time, using a different frequency, using a different channel coding technique, using a different modulation scheme, in the same frame, sub-frame or slot, other space/time requirement or any combination thereof. For example, first node 121, second node 141 and other node can concurrently transmit the DL signal at different times and using different frequency sub-carriers but during the same sub-frame to support, for instance, distributed coding. A person of ordinary skill in the art will recognize that a delay spread between the transmissions of the DL signal by first node 121, second node 141, other node or any combination thereof can provide improved receiver performance for wireless device 101 as long as such delay spread is within the bounds utilized by such receiver. Further, many industry technical standards provide delay spread requirements for wireless devices. Such delay spread requirements or other similar standards can be used to define the acceptable delay spread between transmissions of the DL signal from first node 121, second node 141, other node or any combination thereof.

Prior to transmitting a DL signal to wireless device 101, first node 121 can forward, for instance, the DL signal to second node 141. After second node 141 receives the DL signal, second node 141 can improve the integrity of the received DL signal by, for instance, demodulating and modulating; demodulating, decoding, encoding and modulating; or both. Further, second node 141 can determine a channel quality measurement ("CQM") value using, for instance, the received DL signal; demodulated received DL signal;

demodulated and modulated received DL signal; demodulated and decoded received DL signal; demodulated, decoded and encoded received DL signal; demodulated, decoded, encoded and modulated received DL signal; or any combination thereof. Second node 141 can use the CQM value to determine whether to transmit the received DL signal; demodulated and modulated received DL signal; demodulated, decoded, encoded and modulated received DL signal; or any combination thereof. If second node 141 determines not to transmit the processed received DL signal, then second node 141 can, for instance, monitor for the re-transmission of the DL signal from first node 121, another node or both. If a re-transmitted DL signal is received, second node 121 can, for instance, combine the received DL signal with any previously received DL signals to form a combined DL signal. Such monitoring continues until, for instance, second node 141 determines to transmit the combined DL signal, second node 141 receives a new DL signal from first node 121, expiration of a timer, other event or any combination thereof.

Figure 2:
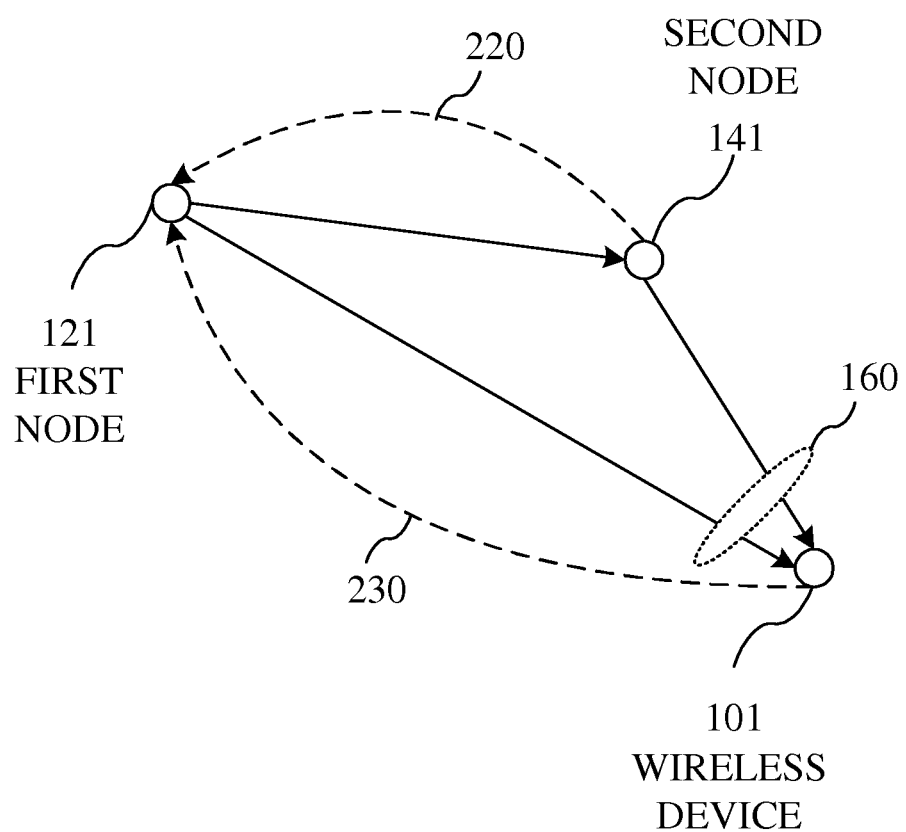
FIG. 2 illustrates another embodiment of improved transmission in a relay node-based wireless communication system in accordance with various aspects set forth herein.

FIG. 2 illustrates another embodiment of a relay node-based wireless communication system 200 in accordance with various aspects set forth herein. In FIG. 2, system 200 can support, for instance, the hybrid automatic repeat request ("HARQ") re-transmission procedure, automatic repeat request ("ARQ") re-transmission procedure or other similar procedure. For example, prior to transmitting a DL signal to wireless device 101, first node 121 can forward the DL signal to second node 141 and can receive a corresponding acknowledged or not acknowledged ("ACK/NACK") signal 220 from second node 141. It is important to recognize that an ACK/NACK signal 220 and 230 can be either an ACK signal to indicate the successful receipt of the DL signal or a NACK signal to indicate the unsuccessful receipt of the DL signal but not both. Further, the reception of a NACK signal may be inferred, for instance, after expiration of a timer or the lack of reception of an ACK signal. Similarly, first node 121, second node 141 or both can transmit the DL signal to wireless device 101, and first node 121 can receive a corresponding ACK/NACK signal 230 from wireless device 101. It is important to recognize that ACK/NACK signal 230 can also be received by second node 141 and forwarded to first node 121.

In this embodiment, prior to or simultaneous with transmitting a DL signal to wireless device 101, first node 121 can forward a DL signal to second node 141. Second node 141 can reply with ACK/NACK signal 220 to first node 121 to indicate whether the DL signal has been received. First node 121 can continue forwarding the DL signal to second node 141 until, for instance, ACK signal 220 is received from second node 141, an ACK signal 230 is received from wireless device 101, a new DL signal is available for transmitting, expiration of a timer, other event or combination of events.

A lower channel quality between first node 121 and second node 141 may increase the time required for first node 121 to receive ACK signal 220 from second node 141 associated with the successful reception of the DL signal. In such circumstance, the latency of system 200 can increase. Once ACK signal 220 is received by first node 121 from second node 141, first node 121 and second node 141 can cooperatively transmit the DL signal to wireless device 101, as represented by 160. First node 121, second node 141 or both can continue to cooperatively transmit the DL signal to wireless device 101 until, for instance, first node 121 receives ACK signal 230 from wireless device 101, expiration of a timer, other event or any combination thereof.

Figure 3:
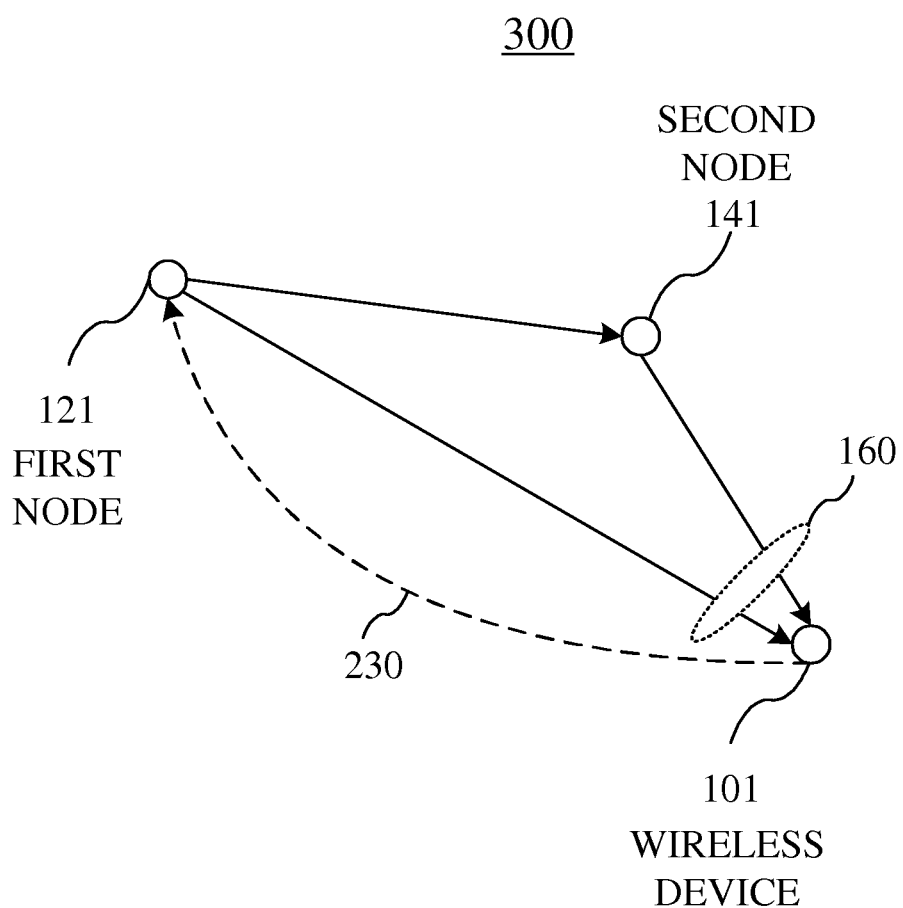
FIG. 3 illustrates another embodiment of improved transmission in a relay node-based wireless communication system in accordance with various aspects set forth herein.

FIG. 3 illustrates another embodiment of relay node-based wireless communication system 300 in accordance with various aspects set forth herein. In FIG. 3, prior to or simultaneous with transmitting a DL signal to wireless device 101, system 300 can allow first node 121 to forward the DL signal to second node 141. First node 121 and second node 141 can then cooperatively transmit the DL signal to wireless device 101, as represented by 160. Further, first node 121 and second node 141 can re-transmit the DL signal to wireless device 101 until, for instance, ACK signal 230 is received by first node 121 from wireless device 101, expiration of a timer, other event or any combination thereof. It is important to recognize that ACK/NACK signal 230 can also be received by second node 141 and forwarded to first node 121.

In this embodiment, second node 141 is not required to send an ACK/NACK signal to first node 121 in response to the forwarding of the DL signal to second node 141. In such circumstance, the latency such as the packet delay of system 300 can decrease, since first node 121 may not be required to wait for an ACK/NACK signal from second node 141 prior to re-forwarding the DL signal to second node 141. However, without any indication of the successful reception of the DL signal, second node 141 may transmit the DL signal with lower integrity such as transmitting a DL signal that fails a cyclic redundancy code ("CRC") check performed by second node 141. In such circumstance, the DL signal transmitted from second node 141 may degrade the quality of the DL signal transmitted by first node 121 as received by wireless device 101.

Figure 4:
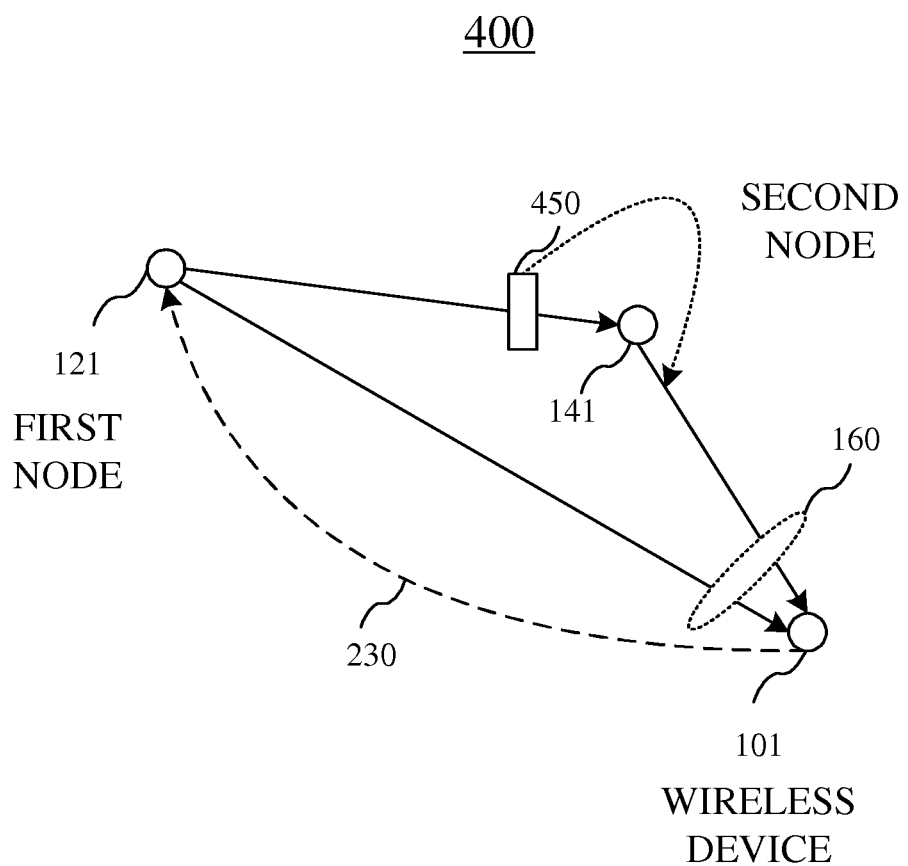
FIG. 4 illustrates another embodiment of improved transmission in a relay node-based wireless communication system in accordance with various aspects set forth herein.

FIG. 4 illustrates another embodiment of improved transmission in a relay node-based wireless communication system 400 in accordance with various aspects set forth herein. In FIG. 4, prior to or simultaneous with transmitting a DL signal to wireless device 101, system 400 can allow first node 121 to forward the DL signal to second node 141. Along with this transmission, first node 121 can indicate, for instance, at a different time, using a different frequency, using a different channel coding technique, using a different modulation scheme, in a specified frame, sub-frame or slot, other space/time requirement or any combination thereof for second node 141 to cooperatively transmit the DL signal with first node 121 to wireless device 101, as represented by 160. Second node 141 can generate a channel quality measurement ("CQM") value 450 using, for instance, the received DL signal and can use CQM value 450 to determine whether to cooperatively transmit the DL signal with first node 121 to wireless device 101. Further, first node 121 and second node 141 can cooperatively re-transmit the DL signal to wireless device 101 until, for instance, ACK signal 230 is received by first node 121 from wireless device 101. It is important to recognize that ACK signal 230 can also be received and forwarded by second node 141 to first node 121.

In another embodiment, CQM value 450 can be compared to a first threshold, wherein the first threshold can represent a certain channel quality. If CQM value 450, for instance, exceeds or equals the first threshold, which may indicate a stronger channel quality, second node 141 can cooperatively transmit with first node 121 the DL signal to wireless device 101. However, if CQM value 450 is, for instance, less than the first threshold, which may indicate a weaker channel quality, second node 141 may monitor for any re-transmitted DL signals from first node 121, another node or both, which are addressed to wireless device 101; may combine any re-transmitted DL signals with any previously received DL signals to form a combined DL signal; may generate CQM value 450 associated with the combined DL signal; and may transmit the combined DL signal if CQM value 450 is, for instance, greater than the first threshold.

In another embodiment, based on CQM value 450 associated with the DL signal forwarded by first node 121, the DL signal re-transmitted by first node 121, other node or both, combined DL signal or any combination thereof, second node 141 can adjust, adapt, control, manage or any combination thereof the transmission parameters associated with, for instance, transmit power, symbol per bit pre-coding, or both.

Figure 5:
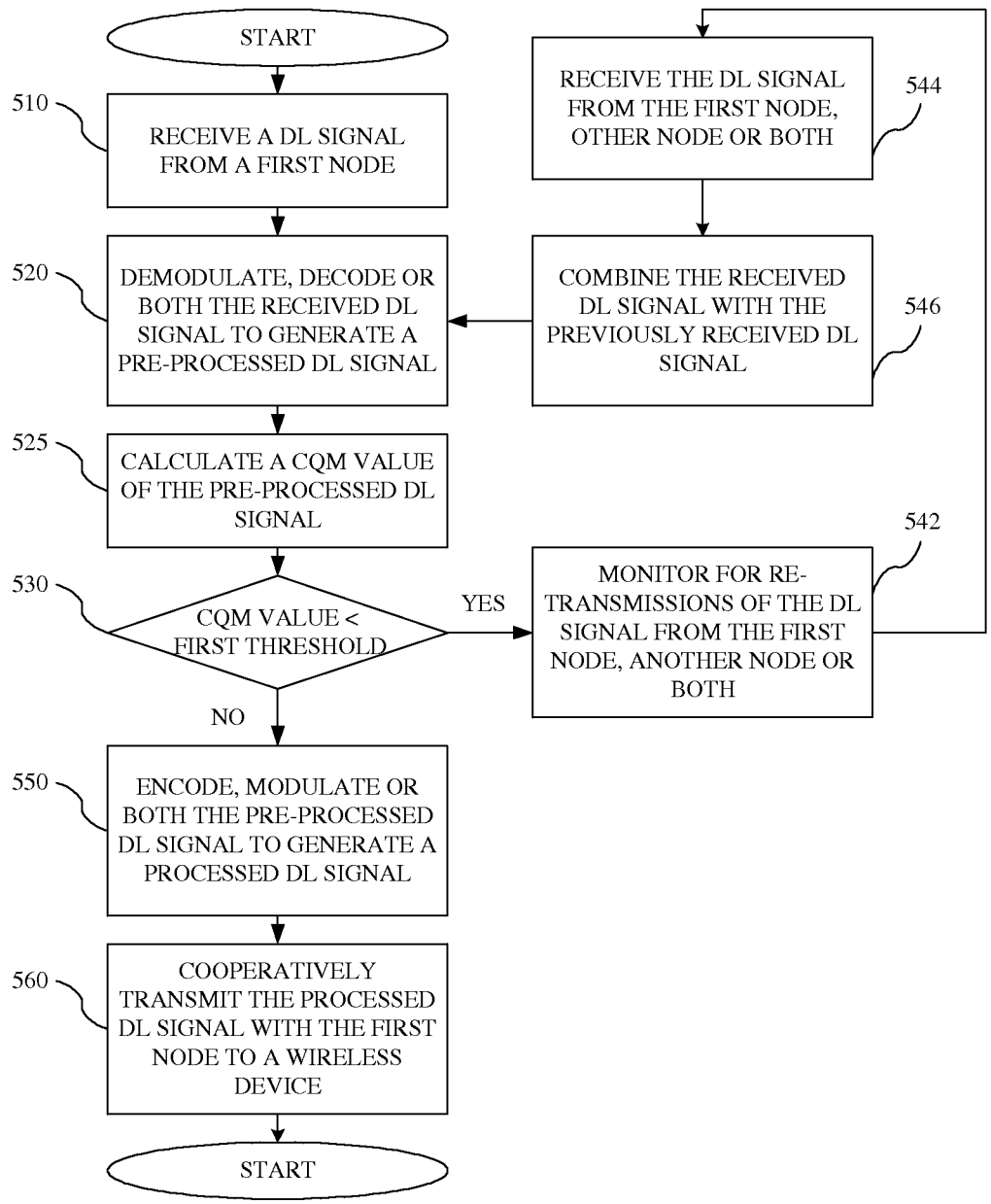
FIG. 5 is a flow chart of one embodiment of a method of improved transmission in a relay node-based wireless communication system in accordance with various aspects set forth herein.

FIG. 5 is a flow chart of one embodiment of a method 500 for improving transmission in relay node-based wireless communication system 100, 200, 300 and 400 in accordance with various aspects set forth herein. In FIG. 5, method 500 can start at, for instance, block 510, where method 500 can receive a DL signal from first node 121, which may be identified for transmission to wireless device 101. At block 520, method 500 can demodulate, decode or both the received DL signal to form a pre-processed DL signal. At block 525, method 500 can generate a CQM value using the received DL signal, pre-processed DL signal or both. At block 530, method 500 can compare the CQM value with a first threshold. If the CQM value is, for instance, greater than or equal to the first threshold, at block 550, method 500 can encode, modulate or both the pre-processed DL signal to form a processed DL signal. Such encoding, modulation or both may be selected by wireless device 101, first node 121 or both. At block 560, method 500 can allow second node 141 to cooperatively transmit the processed DL signal with first node 121 to wireless device 101. Further, method 500 can allow second node 141 to transmit the processed DL signal to wireless device 101 using a power setting associated with, for instance, the CQM value, the resources as scheduled by first node 121 or both.

In FIG. 5, at block 542, if the CQM value is, for instance, less than the first threshold, method 500 can monitor for the re-transmission of the DL signal from first node 121, another node or both. At block 544, method 500 can receive the re-transmitted DL signal from first node 121, the other node or both. At block 546, method 500 can combine the re-transmitted DL signal from first node 121, other node or both with any previously received DL signal transmitted by first node 121, other node or both to form a combined DL signal. Further, first node 121, other node or both may associate any transmitted DL signal with wireless device 101. It is important to recognize that first node 121, other node or both can re-transmit the DL signal due to, for instance, first node 121 not receiving an ACK signal from wireless device 101 associated with the previous DL signal transmission from first node 121, other node or both. Further, at block 520, method 500 can demodulate, decode or both the combined DL signal to form a pre-processed DL signal. At block 525, method 500 can generate a CQM value using the combined DL signal, pre-processed DL signal or both. Method 500 can continue to receive, process and combine any re-transmitted DL signals until, at block 530, the CQM value is, for instance, greater than or equal to the first threshold. At block 550, method 500 can encode, modulate or both the pre-processed DL signal to generate the processed DL signal. At block 560, method 500 can cooperatively transmit the processed DL signal with first node 101 to wireless device 101 using a transmit power setting associated with, for instance, the CQM value, the resources as scheduled by first node 121 or both. Alternatively, the transmit power level may be provided by first node 121.

In another embodiment, the receiver performance of second node 141 can be improved by, for instance, combining a currently received DL signal with any previously received DL signals. For example, if a previously received DL signal includes a subset of parity bits and a currently received DL signal includes a different subset of parity bits, incremental redundancy gain can be achieved by combining these signals prior to demodulating, decoding or both.

In another embodiment, pre-coding can be applied to the processed DL signal as instructed by wireless device 101, first node 121 or both. Further, such pre-coding can be distributed across antennas 129 of first node 121, second node 141 or both. It is important to recognize that such distributed coding can allow wireless device 101 to demodulate the DL signal even when second node 141 does not transmit the DL signal. Further, such pre-coding can apply, for instance, a beam forming vector, which can be used to shape the transmission beam for wireless device 101 using antennas 129 of first node 121, second node 141 or both. Also, such pre-coding can apply, for instance, an antenna vector, which can be used to improve the quality of the transmitted DL signal received at wireless device 101.

In another embodiment, second node 141 can operate as a half-duplex node, wherein second node 141 may discontinue monitoring for re-transmissions of a DL signal after transmitting the processed DL signal to wireless device 101.

In another embodiment, second node 141 can operate as a full-duplex node, wherein second node 141 can continue monitoring for re-transmissions of a DL signal, can update the CQM value for each received DL signal, and can transmit the updated processed DL signal, independent of whether the processed DL signal has been transmitted to wireless device 101.

Figure 6:
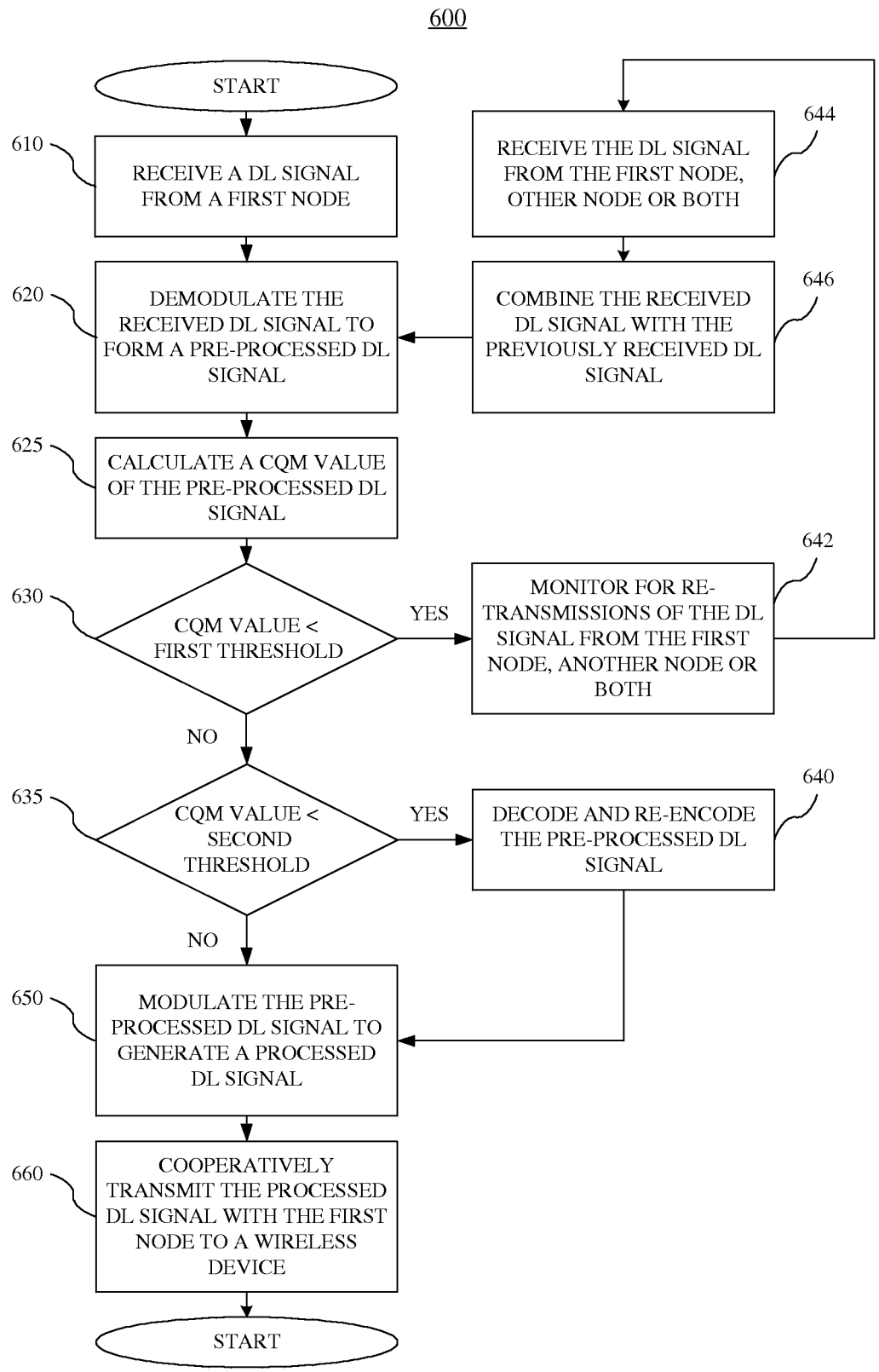
FIG. 6 is a flow chart of another embodiment of a method of improved transmission in a relay node-based wireless communication system in accordance with various aspects set forth herein.

FIG. 6 is a flow chart of another embodiment of a method 600 for improving transmission in relay node-based wireless communication system 100, 200, 300 and 400 in accordance with various aspects set forth herein. In FIG. 6, method 600 can start at, for instance, block 610, where method 600 can receive a DL signal forwarded from first node 121, which may be addressed to wireless device 101. At block 620, method 600 can demodulate the received DL signal to form a pre-processed DL signal. At block 625, method 600 can generate a CQM value of the pre-processed DL signal. At block 630, method 600 can determine whether to transmit a processed received DL signal by comparing the CQM value with a first threshold. At block 635, if the CQM value is, for instance, greater than or equal to the first threshold, method 600 can further determine whether to decode and re-encode the pre-processed DL signal by comparing the CQM value with a second threshold. At block 640, if the CQM value is, for instance, greater than or equal to the second threshold, method 600 can decode and re-encode the pre-processed DL signal. If the CQM value is, for instance, less than the second threshold, at block 650, method 600 can modulate the pre-processed DL signal to form the processed DL signal. At block 660, method 600 can allow second node 141 to cooperatively transmit with first node 121 the processed DL signal to wireless device 101, as represented by 160. Further, method 600 can allow second node 141 to cooperatively transmit the processed DL signal with first node 121 to wireless device 101 using a power setting which is based on, for instance, the CQM value, the resources as scheduled by wireless device 101, first node 121 or both.

In FIG. 6, at block 642, method 600 can monitor for the re-transmission of the DL signal from first node 121, another node or both. At block 644, method 600 can receive the re-transmitted DL signal from first node 121, the other node or both. At block 646, method 600 can combine the received DL signal with any previously received DL signals to form a combined DL signal. At block 640, method 600 can further utilize incremental redundancy or chase combining methods in decoding and re-encoding the combined DL signal. Further, at block 620, method 600 can demodulate the combined DL signal. Method 600 can generate a CQM value using the combined DL signal. Method 600 can continue to receive, process and combine any received DL signals until the CQM value associated with the combined DL signal is, for instance, greater than the first threshold, wherein method 600 can transmit the combined DL signal.

In this embodiment, when the CQM value is, for instance, greater than or equal to the second threshold, which can indicate better channel quality, method 600 can forego the decoding and re-encoding process of block 640 and can transmit the processed DL signal after demodulating and modulating the received DL signal. By not having to decode and re-encode, method 600 can, for instance, reduce transmission delay, processing, power consumption or any combination thereof.

Figure 7:
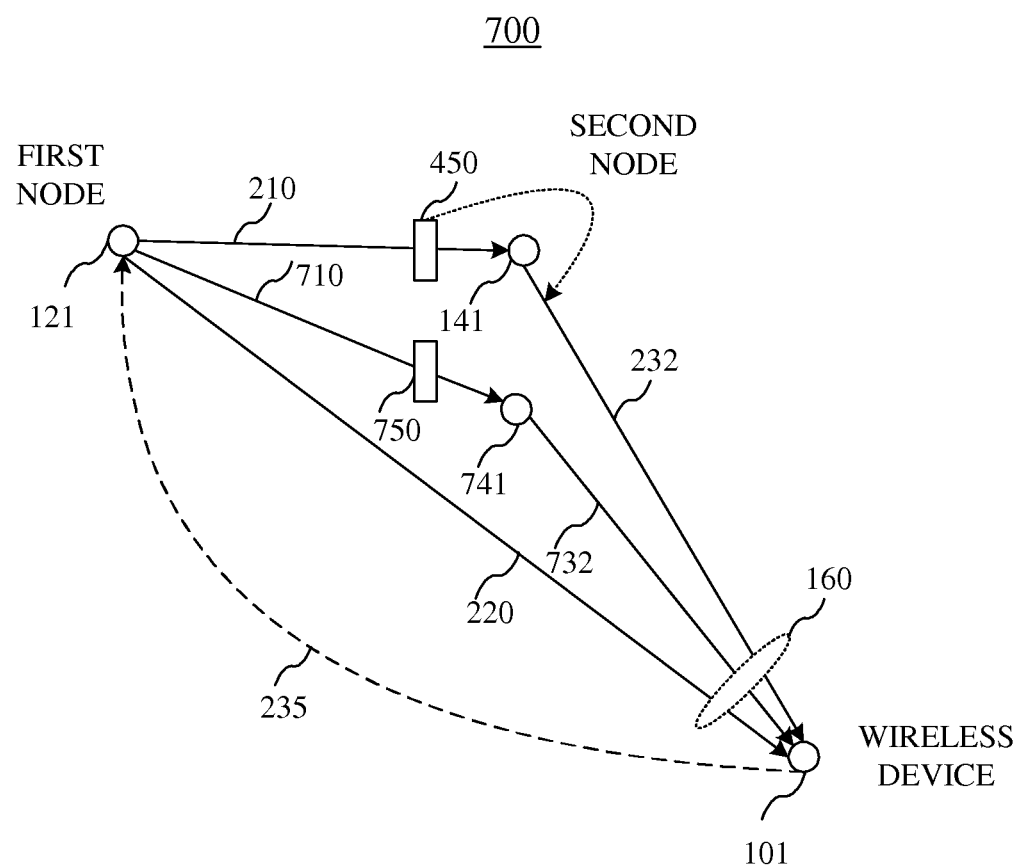
FIG. 7 illustrates one embodiment of improved transmission in a multiple-hop, relay node-based wireless communication system in accordance with various aspects set forth herein.

FIG. 7 illustrates another embodiment of improved transmission in multiple-hop, relay node-based wireless communication system 700 in accordance with various aspects set forth herein. In FIG. 7, system 700 can include first node 121, second node 141, other node 741 and wireless device 101. Prior to transmitting the DL signal to wireless device 101, first node 121 can forward the DL signal to second node 141 and other node 741. Further, first node 121 can indicate to second node 141, other node 741 or both to transmit the DL signal to wireless device 101 at a different time, using a different frequency, using a different channel coding technique, using a different modulation scheme, in a specified frame, sub-frame or slot, other space/time requirement or any combination thereof. Further, first node 121 may provide an encoding format, modulation format, transmit power level, other parameter or any combination thereof to second node 141, other node 741 or both. First node 121, second node 141, other node 741 or any combination thereof can cooperatively transmit the DL signal to wireless device 101, as represented by 160, in accordance with, for instance, a resource scheduler residing in first node 121.

In another embodiment, the receiver performance of second node 141, other node 741 or both can be improved by, for instance, combining a currently received re-transmitted DL signal with any previously received DL signals. For example, if a previously received DL signal includes a subset of parity bits and a currently received re-transmitted DL signal includes a different subset of parity bits, incremental redundancy gain can be achieved by combining these signals prior to demodulating, decoding or both.

In another embodiment, each node 141 and 741 can determine CQM value 450 and 750 of the DL signal and can compare CQM value 450 and 750 to a first threshold, wherein the first threshold can indicate a stronger channel quality. Each node 141 and 741 can transmit the DL signal to wireless device 101 if the CQM value, for instance, is greater than or equal to the first threshold. However, if the CQM value is, for instance, less than the first threshold, which may indicate a weaker channel quality, each node 141 and 741 may determine to monitor for any re-transmitted DL signals from first node 121; combine currently received re-transmitted DL signals with any previously received DL signals to form a combined DL signal; generate a CQM value associated with the combined DL signal; and transmit the combined DL signal if the CQM value is, for instance, greater than or equal to the first threshold.

In another embodiment, based on CQM value 450 and 750 associated with the DL signal, re-transmitted DL signal, combined DL signal or any combination thereof, each node 141 and 741 can adjust, adapt, control, manage or any combination thereof the transmission parameters associated with, for instance, transmit power, symbol per bit pre-coding, or both.

Figure 8A:
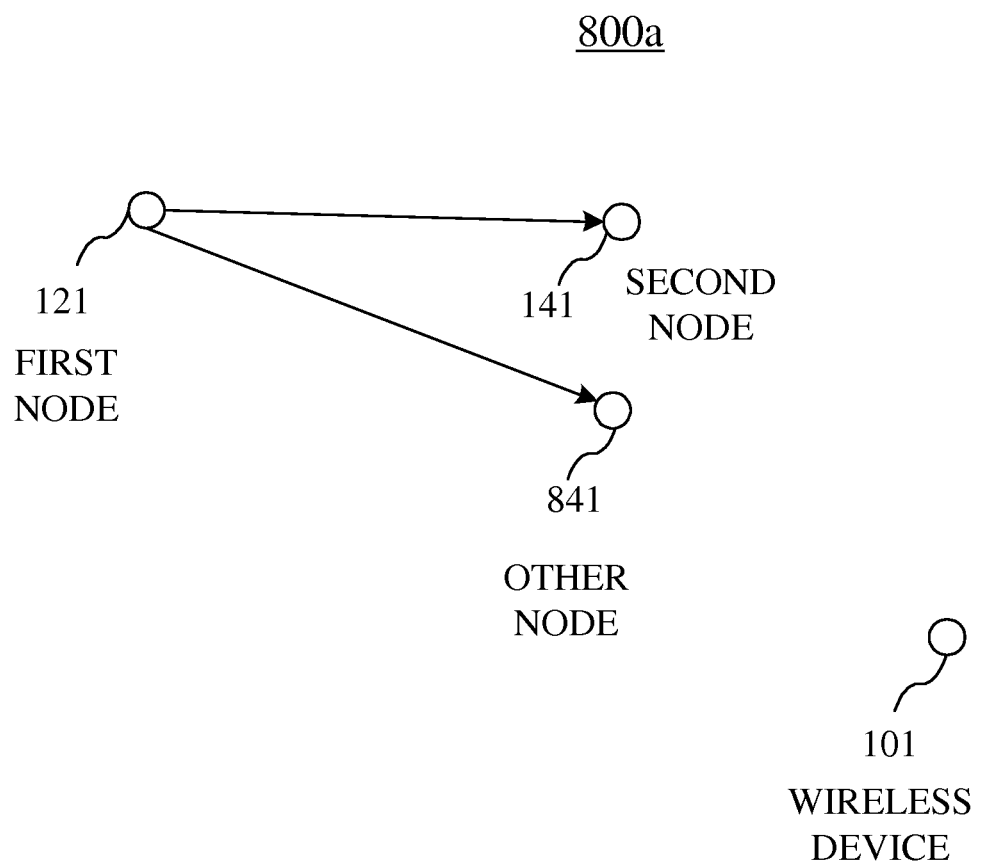
FIGS. 8A, 8B and 8C collectively illustrate an example of improved transmission in a multiple-hop, relay node-based wireless communication system.
Figure 8B:
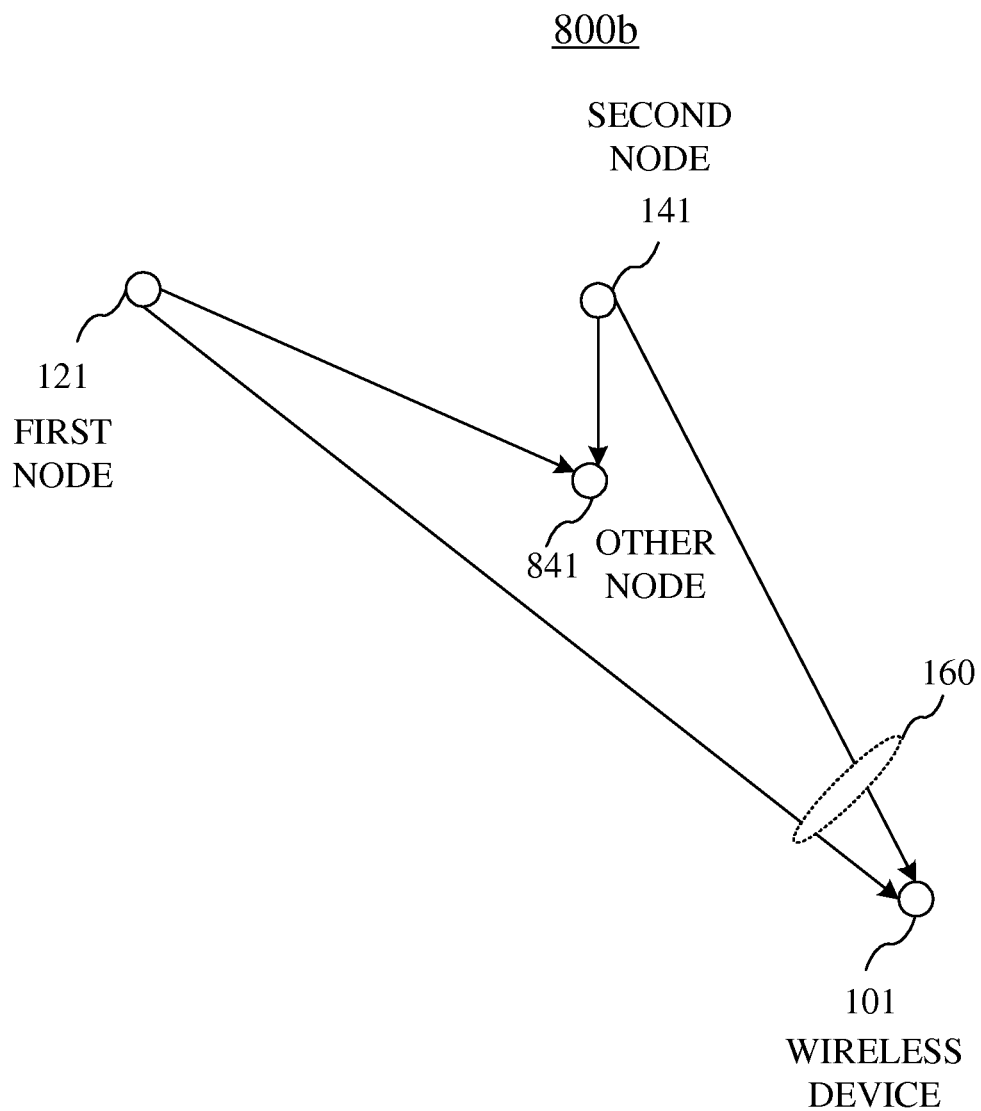
Figure 8C:
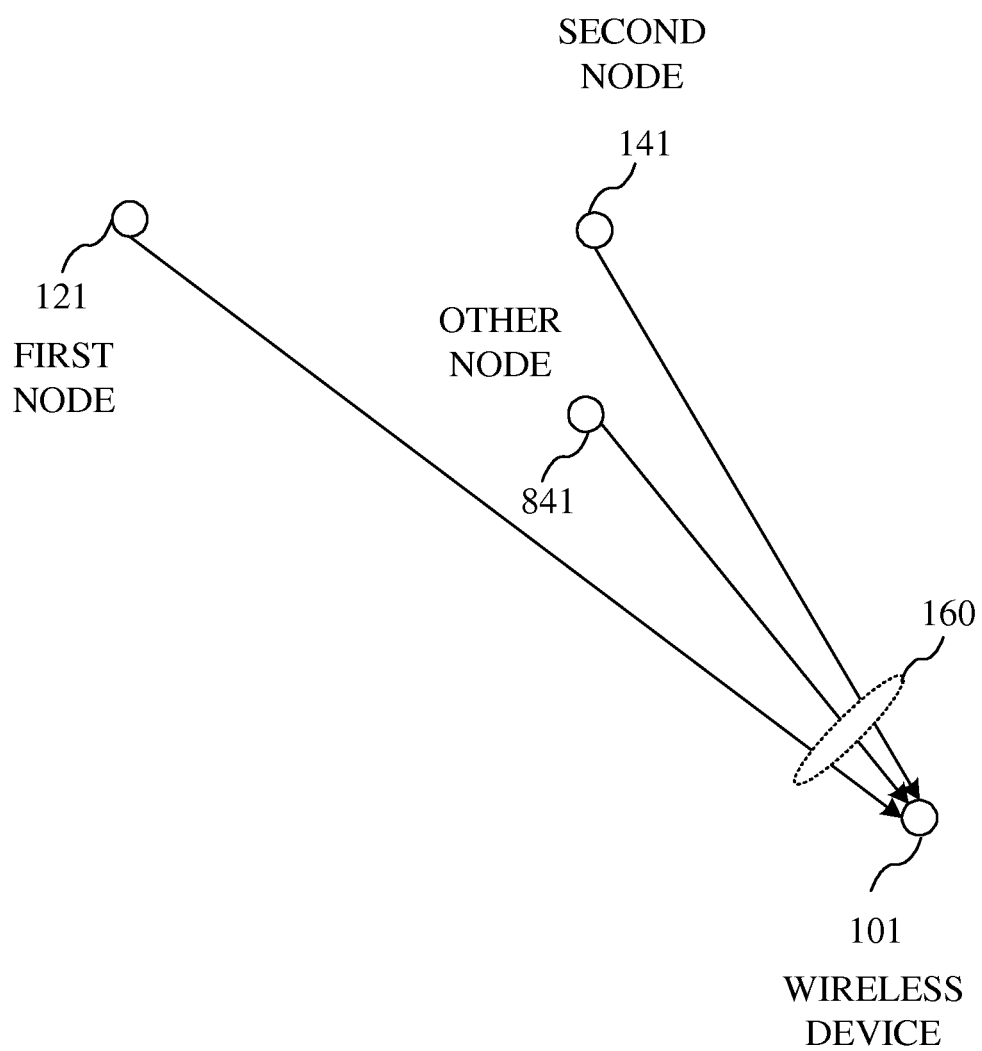

FIGS. 8A, 8B and 8C collectively illustrate an example of improved transmission in multiple-hop, relay node-based wireless communication system 700. In FIG. 8A, prior to transmitting a DL signal to wireless device 101, first node 121 forwards the DL signal to second node 141 and other node 841. The graphical illustration of FIG. 8A in its entirety is referred to by 800*a*. In FIG. 8B, based on the CQM value of the received DL signal, second node 141 determines to cooperatively transmit the received DL signal with first node 121 to wireless device 101, as represented by 160. Based on the CQM value of the received DL signal, other node 841 determines not to transmit the received DL signal but to monitor for re-transmissions of the DL signal from first node 121, second node 141 or both to improve the quality of the combined DL signal. The graphical illustration of FIG. 8B in its entirety is referred to by 800*b*. In FIG. 8C, other node 841 combines the currently received DL signals from first node 121, second node 141 or both with the previously received DL signal to improve the quality of the combined DL signal. Based on the CQM value of the combined DL signal, other node 841 determines to cooperatively transmit the combined DL signal with first node 121, second node 141 or both to wireless device 101, as represented by 160, and at a different time, using a different frequency, using a different channel coding technique, using a different modulation scheme, in a specified frame, sub-frame or slot, other space/time requirement or any combination thereof. The graphical illustration of FIG. 8C in its entirety is referred to by 800*c*.

Figure 9A:
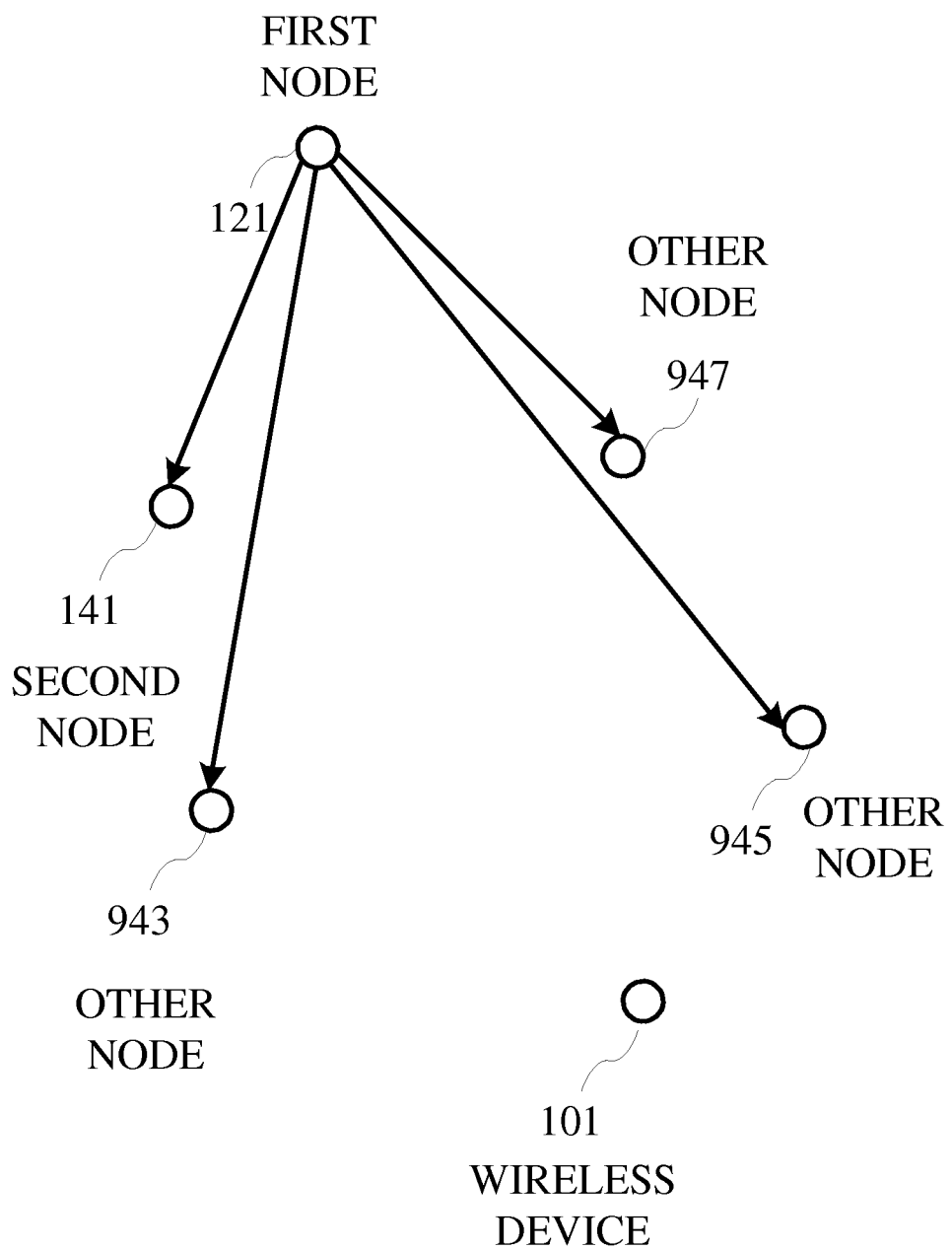
FIGS. 9A, 9B and 9C collectively illustrate an example of improved transmission in a multiple-hop, relay node-based wireless communication system.
Figure 9B:
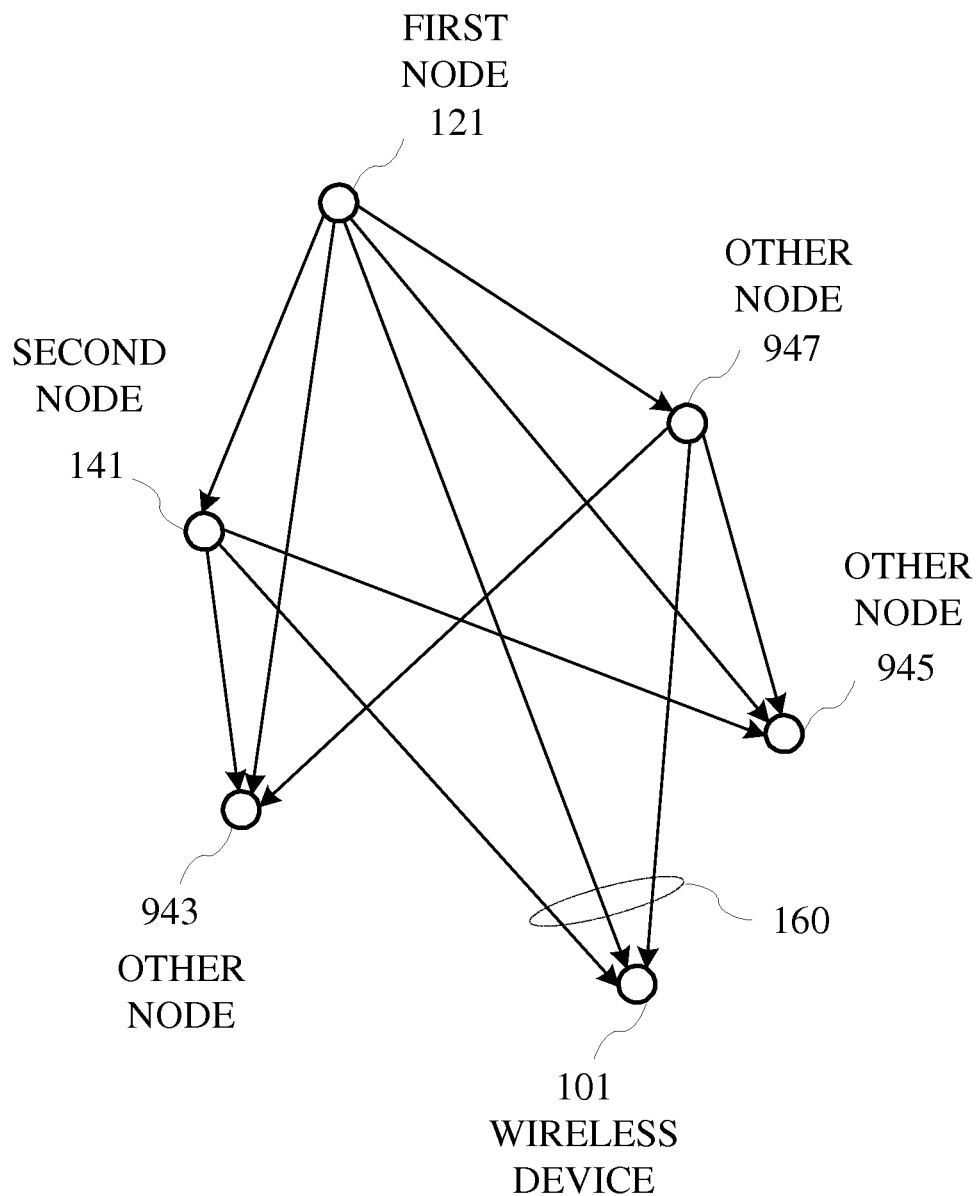
Figure 9C:
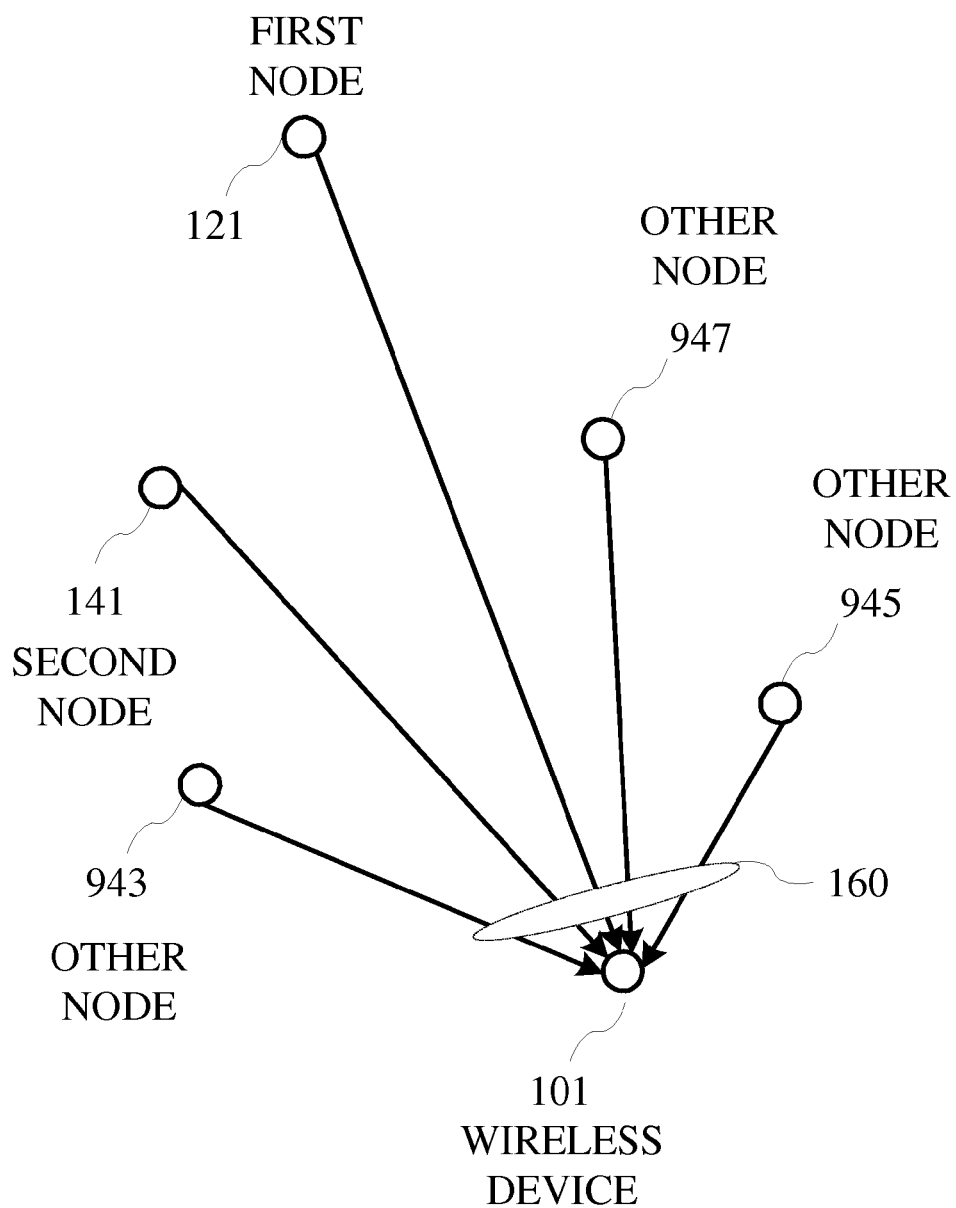

FIGS. 9A, 9B and 9C collectively illustrate an example of improved transmission in multiple-hop, relay node-based wireless communication system 700. In FIG. 9A, prior to transmitting a DL signal to wireless device 101, first node 121 can forward the DL signal to second node 141 and other nodes 943, 945 and 947. The graphical illustration of FIG. 9A in its entirety is referred to by 900*a*. In FIG. 9B, second node 141 and other node 947 are closer to first node 121 than other nodes 943 and 945. Further, nodes 943 and 945 can monitor for re-transmissions of the DL signal from first node 121, second node 141, other node 947 or any combination thereof. Based on the CQM value of the received DL signal, second node 141 and other node 947 determine to cooperatively transmit the received DL signal with first node 121 to wireless device 101, as represented by 160. However, based on the CQM value of the received DL signal, nodes 943 and 945 determine not to transmit the received DL signal to wireless device 101. Instead, nodes 943 and 945 monitor for re-transmissions of the DL signal from first node 121, second node 141 and other node 947 or any combination thereof to improve the quality of the combined DL signal. The graphical illustration of FIG. 9B in its entirety is referred to by 900*b*. In FIG. 9C, each other node 943 and 945 combines the currently received DL signal from first node 121, second node 141, other node 947 or any combination thereof with the previously received DL signals to improve the quality of the combined DL signal. Based on the CQM value of the combined DL signal, each other node 943 and 945 determines to cooperatively transmit the combined DL signal with first node 121, second node 141, other node 947 or any combination thereof to wireless device 101, as represented by 160, and at a different time, using a different frequency, using a different channel coding technique, using a different modulation scheme, in a specified frame, sub-frame or slot, other space/time requirement or any combination thereof. The graphical illustration of FIG. 9C in its entirety is referred to by 900*c*.

Figure 10:
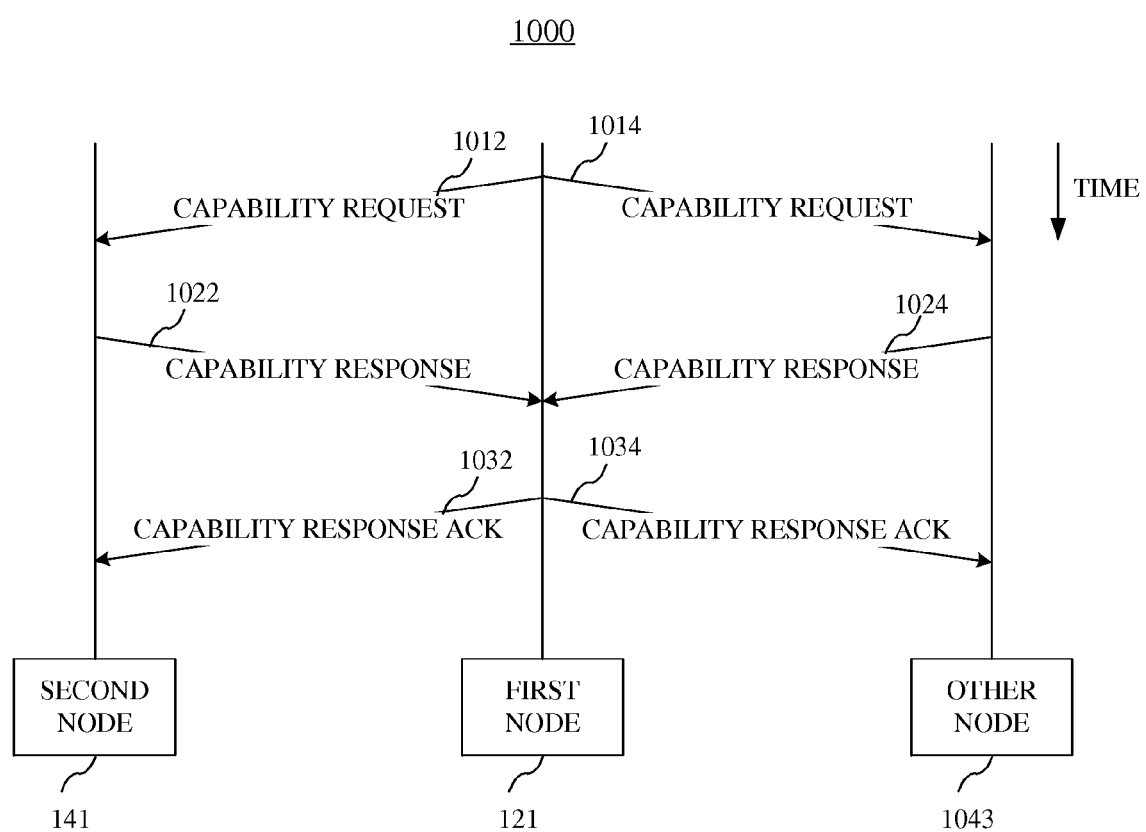
FIG. 10 illustrates one embodiment of a method of configuring a relay node-based wireless communication system in accordance with various aspects set forth herein.

FIG. 10 illustrates one embodiment of method 1000 of configuring relay-based wireless communication system 100, 200, 300, 400 and 700 in accordance with various aspects set forth herein. Various illustrative structures are shown in the lower portion of FIG. 10 to facilitate understanding of method 1000. Accordingly, method 1000 includes communication amongst a first node 121, a second node 141, another node 1043 or any combination thereof. In this embodiment, latency such as transmission delay can be improved by knowing for each node 141 and 1043, for instance, its capabilities, its channel quality between first node 121, other factor or any combination thereof. By knowing these factors for each node 141 and 1043, first node 121 can, for instance, select parameters suited for each node 141 and 1043. Further, first node 121 can configure each node 141 and 1043 by, for instance, communicating all or a portion of these parameters.

In FIG. 10, method 1000 can allow first node 121 to send a capability request signal 1012 and 1014 to each node 141 and 1043, respectively. Method 1000 can allow each node 141 and 1043 to reply to first node 121 by sending, for instance, a capability response signal 1022 and 1024, respectively. Method 1000 can allow first node 121 to use capability response signal 1022 and 1024 to determine parameters best suited for each node 141 and 1043, respectively. Further, method 1000 can allow first node 121 to communicate the parameters for each node 141 and 1043 by sending a capability response ACK signal 1032 and 1034 to each node 141 and 1043, respectively. If first node 121 did not receive capability response signal 1022 and 1024, then capability request signal 1012 and 1014 can be re-sent to node 141 and 1043, respectively, after, for instance, a predetermined time. Similarly, if node 141 and 1043 did not receive capability response ACK signal 1032 and 1034 from first node 121, then capability response signal 1022 and 1024, respectively, can be re-sent. After a predetermined number of re-transmission attempts, a failure of the communication link between first node 121 and node 141 and 1043 can be declared. Once a failure of the communication link is declared, node 141 and 1043 may perform an initial node-rediscovery operation, synchronization operation, other operation or any combination thereof.

In this embodiment, capability response signal 1012 and 1014 from each node 141 and 1043 can include, for instance, the expected maximum scheduling delay in the transmit chain, the number of transmit and receive antennas, CQM threshold for demodulating only, CQM threshold for demodulating and decoding, full/half-duplex capability, other capability or any combination thereof. The expected maximum scheduling delay can further include, for instance, the pipeline delay of the transmit chain, receive chain or both, the maximum delay in the encoding process, decoding process or both, or both.

Figure 11:
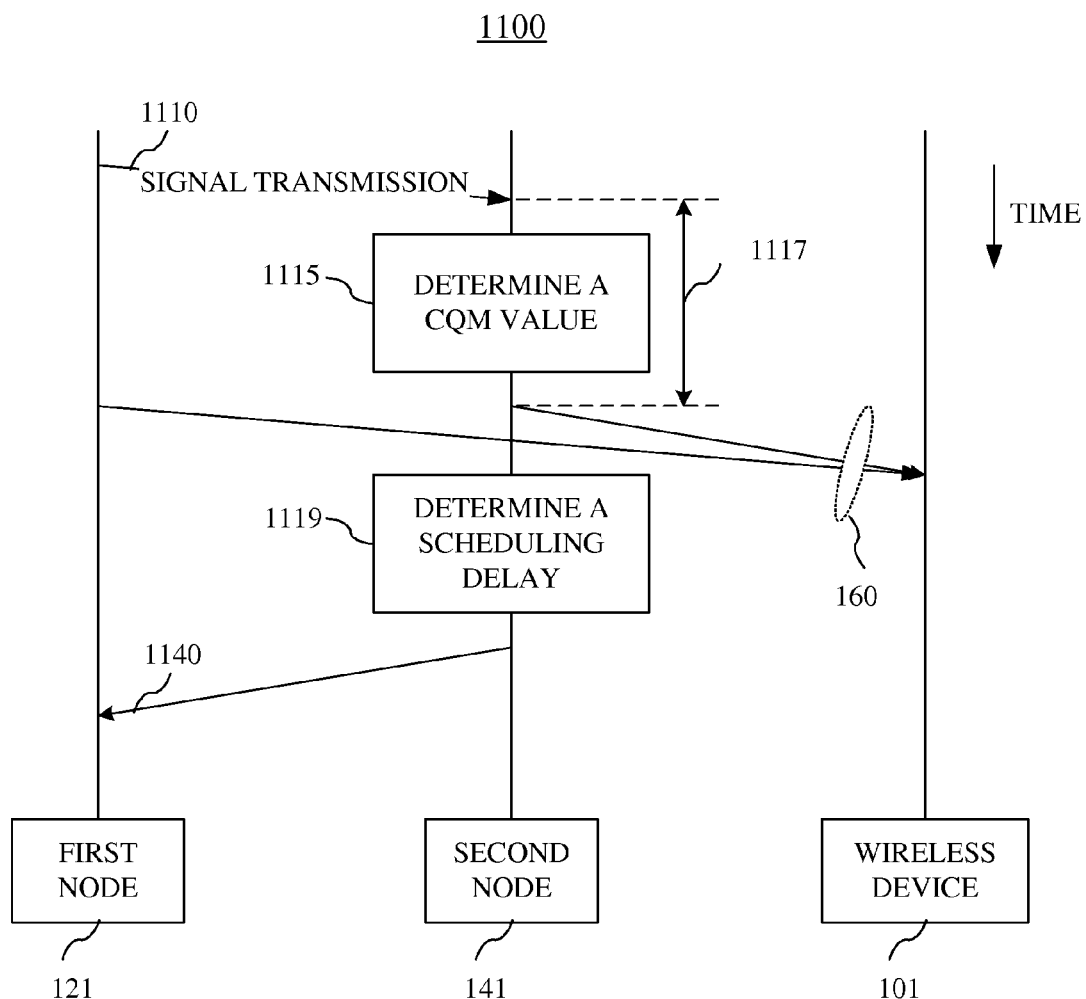
FIG. 11 illustrates one embodiment of a method of reducing latency in a relay node-based wireless communication system in accordance with various aspects set forth herein.

FIG. 11 illustrates one embodiment of method 1100 of reducing latency in relay-based wireless communication system 100, 200, 300, 400 and 700 in accordance with various aspects set forth herein. Various illustrative structures are shown in the lower portion of FIG. 11 to facilitate understanding of method 1100. Accordingly, method 1100 includes communication amongst a wireless device 101, a first node 121, a second node 141 or any combination thereof. In FIG. 11, method 1100 can allow second node 141 to receive a DL signal from first node 121, as shown at 1110. At block 1115, method 1100 can determine a CQM value of the received DL signal. When the CQM value represents lower channel quality, second node 141 may require more processing time to, for instance, receive the DL signal, process the received DL signal, cooperatively transmit the processed DL signal with first node 121 to wireless device 101, as represented by 160, or any combination thereof. Alternatively, when the CQM value represents higher channel quality, second node 141 may require less processing time to, for instance, receive the DL signal, process the received DL signal including determining a CQM value, cooperatively transmit the processed DL signal with first node 121 to wireless device 101, as represented by 160, or any combination thereof. Since the processing time can be directly correlated to the CQM value, the scheduling delay can be adjusted to reduce the transmission delay; thus, reducing latency in system 100, 200, 300, 400 and 700. The scheduling delay, as represented by 1117, can be the difference in time between, for instance, receiving the DL signal from first node 121 and transmitting the processed DL signal to wireless device 101, In FIG. 11, at block 1119, after transmitting a processed DL signal to wireless device 101, second node 141 can determine the scheduling delay, generate a correction factor to adjust such delay or both. Further, such delay may be continuously, periodically, aperiodically or any combination thereof adjusted as a function of the CQM value, actual or expected system load, other factor or any combination thereof. Second node 141 can send, for instance, the scheduling delay, correction factor or both to first node 121, as shown at 1140. It is important to recognize that since the scheduling delay may be slowly varying, the correction factor can be cumulative and represented by, for instance, a small amount of information such as a few bits.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others may be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method of wireless communication, comprising:
   receiving a downlink signal from a first node;
   demodulating said received downlink signal to form a pre-processed downlink signal;
   generating a channel quality measurement ("CQM") value of said pre-processed downlink signal;
   when said CQM value exceeds a first threshold indicating a certain channel quality:
   determining if said CQM value exceeds a second threshold indicating a better channel quality;
   when said CQM value does not exceed the second threshold,
   decoding and re-encoding said pre-processed downlink signal;
   modulating said pre-processed downlink signal to form a processed downlink signal; and
   cooperatively transmitting said processed downlink signal with said first node to a wireless device; and
   when said CQM value does not exceed a first threshold, not transmitting said pre-processed downlink signal and monitoring for a re-transmission of the downlink signal;
   sending a list of capabilities via a capability response signal to said first node, the list comprising at least one of an expected maximum scheduling delay, a CQM threshold for only demodulating a signal, and a CQM threshold for demodulating and decoding a signal; and receiving a capability response acknowledgement from said first node comprising parameters based on the list for cooperatively transmitting with said first node.

2. The method of claim 1, wherein said decoding and encoding said pre-processed downlink signal uses at least one of incremental redundancy and chase combining.

3. The method of claim 1, wherein said generating a channel quality measurement ("CQM") value of said pre-processed downlink signal uses at least one of a signal strength value of said received signal and a bit error rate ("BER") value of said received downlink signal.

4. The method of claim 1, wherein said first threshold is provided by said first node.

5. The method of claim 1, wherein said first threshold is determined using at least one of channel quality, node capability and system load.

6. The method of claim 1, wherein said second threshold is provided by said first node.

7. The method of claim 1, further comprising:
monitoring for a re-transmission of said downlink signal from said first node, another node or both;
receiving said re-transmitted downlink signal from said first node, said other node or both; and
combining said received downlink signal with said received re-transmitted downlink signal.

8. The method of claim 1, further comprising:
applying pre-coding to said processed downlink signal.

9. The method of claim 1, further comprising the step of adjusting a scheduling delay based on the CQM value.

10. A node for wireless communication, comprising:
a processor coupled to a memory containing processor-executable instructions, wherein said processor is operable to:
receive a downlink signal from a first node;
demodulate said received downlink signal to form a pre-processed downlink signal;
generate a channel quality measurement ("CQM") value of said pre-processed downlink signal;
when said CQM value exceeds a first threshold indicating an acceptable channel quality:
determine if said CQM value exceeds a second threshold indicating a better channel quality;
when said CQM value does not exceed the second threshold, decode and re-encode said pre-processed downlink signal;
modulate said pre-processed downlink signal to form a processed downlink signal; and
cooperatively transmit said processed downlink signal with said first node to a wireless device; and
when said CQM value does not exceed a first threshold, not transmitting said pre-processed downlink signal and monitoring for a re-transmission of the downlink signal;
send a list of capabilities via a capability response signal to said first node, the list comprising at least one of an expected maximum scheduling delay, a CQM threshold for only demodulating a signal, and a CQM threshold for demodulating and decoding a signal; and
receive a capability response acknowledgement from the first node comprising parameters based on the list for cooperatively transmitting with said first node.

11. The node of claim 10, wherein said processor is further operable to:
monitor for a re-transmission of said downlink signal from another node;
receive said re-transmitted downlink signal from said other node; and
combine said received downlink signal with said received re-transmitted downlink signal.

12. The node of claim 10, wherein said processor is further configured to adjust a scheduling delay based on the CQM value.

13. A node for wireless communication, comprising:
a receiver to receive a downlink signal from a first node and demodulate said received signal to form a pre-processed downlink signal;
a channel quality measurement ("CQM") processor to generate a channel quality measurement ("CQM") value of said pre-processed downlink signal and to determine when said CQM value exceeds a first threshold indicating a certain channel quality if said CQM value exceeds a second threshold indicating a better channel quality;
a transmitter to, when said CQM value does not exceed the second threshold, decode and re-encode said pre-processed downlink signal; when said CQM value exceeds a first threshold, to modulate said pre-processed downlink signal to form a processed downlink signal and to cooperatively transmit said processed downlink signal with said first node to a wireless device; and when said CQM value does not exceed a first threshold, to not transmit the pre-processed downlink signal and monitor for re-transmission of the downlink signal; and
a capability request processor that sends a list of capabilities via a capability response signal to said first node, the list comprising at least one of an expected maximum scheduling delay, a CQM threshold for only demodulating a signal, and a CQM threshold for demodulating and decoding a signal; and receives a capability response acknowledgement from the first node comprising parameters based on the list for cooperatively transmitting with said first node.

14. The node of claim 13, wherein said receiver is further operable to receive said downlink signal from another node and combine said received downlink signals.

15. The node of claim 13, wherein said transmitter is further operable to adjust a scheduling delay based on the CQM value.

16. A system of wireless communication, comprising:
a wireless device;
a first node communicatively linked to said wireless device, wherein said first node transmits a downlink signal to said wireless device; and
a second node, wherein said second node receives said downlink signal from said first node, demodulates said received downlink signal to form a pre-processed downlink signal, determines a channel quality measurement ("CQM") value of said pre-processed downlink signal;
when said CQM value exceeds a first threshold indicating a certain channel quality:
determines if said CQM value exceeds a second threshold indicating a better channel quality;
when said CQM value does not exceed the second threshold, decodes and re-encodes said pre-processed downlink signal;
modulates said pre-processed downlink signal to form a processed downlink signal, and cooperatively transmits said processed downlink signal with said first node to a wireless device; and
when said CQM value does not exceed a first threshold, does not transmit the pre-processed downlink signal and monitors for re-transmission of the downlink signal;
wherein said second node sends a list of capabilities via a capability response signal to said first node, the list comprising at least one of an expected maximum scheduling delay, a CQM threshold for only demodulating a signal, and a CQM threshold for demodulating and decoding a signal; and wherein said first node sends capability response acknowledgement from the first node comprising parameters based on the list for the second node to cooperatively transmit with said first node.

17. The system of claim 16, wherein said first node is a base station.

18. The system of claim 16, wherein said second node is a remote node ("RN").

19. The system of claim 16, wherein said second node further adjusts a scheduling delay based on the CQM value.

* * * * *